(12) United States Patent
Kiser et al.

(10) Patent No.: US 11,637,974 B2
(45) Date of Patent: *Apr. 25, 2023

(54) SYSTEMS AND METHODS FOR HDR VIDEO CAPTURE WITH A MOBILE DEVICE

(71) Applicant: Contrast, Inc., Albuquerque, NM (US)

(72) Inventors: Willie C. Kiser, Albuquerque, NM (US); Nora Tocci, Albuquerque, NM (US); Michael D. Tocci, Albuquerque, NM (US)

(73) Assignee: CONTRAST, INC., Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/076,971

(22) Filed: Oct. 22, 2020

(65) Prior Publication Data
US 2021/0044765 A1 Feb. 11, 2021

Related U.S. Application Data

(63) Continuation of application No. 16/379,318, filed on Apr. 9, 2019, now Pat. No. 10,819,925, which is a
(Continued)

(51) Int. Cl.
*H04N 5/355* (2011.01)
*G02B 27/10* (2006.01)
(Continued)

(52) U.S. Cl.
CPC ........... *H04N 5/355* (2013.01); *G02B 27/106* (2013.01); *G02B 27/108* (2013.01);
(Continued)

(58) Field of Classification Search
CPC .... H04N 5/355; H04N 5/2253; H04N 5/2254; H04N 5/2257; H04N 5/2258;
(Continued)

(56) References Cited

U.S. PATENT DOCUMENTS

| 2,560,351 A | 7/1951 | Kell |
|---|---|---|
| 2,642,487 A | 6/1953 | Schroeder |

(Continued)

FOREIGN PATENT DOCUMENTS

| CN | 101344706 B | 9/2010 |
|---|---|---|
| CN | 105472265 | 4/2016 |

(Continued)

OTHER PUBLICATIONS

Myszkowki, 2008, High Dynamic Range Video, Morgan & Claypool Publishers, San Rafael, CA (158 pages).
(Continued)

*Primary Examiner* — Jefferey F Harold
*Assistant Examiner* — Timothy R Newlin
(74) *Attorney, Agent, or Firm* — Withers Bergman LLP; Thomas C. Meyers

(57) ABSTRACT

The invention is relates to systems and methods for high dynamic range (HDR) image capture and video processing in mobile devices. Aspects of the invention include a mobile device, such as a smartphone or digital mobile camera, including at least two image sensors fixed in a co-planar arrangement to a substrate and an optical splitting system configured to reflect at least about 90% of incident light received through an aperture of the mobile device onto the co-planar image sensors, to thereby capture a HDR image. In some embodiments, greater than about 95% of the incident light received through the aperture of the device is reflected onto the image sensors.

17 Claims, 5 Drawing Sheets

Related U.S. Application Data continuation of application No. 15/178,451, filed on Jun. 9, 2016, now Pat. No. 10,264,196, which is a continuation-in-part of application No. 15/169,006, filed on May 31, 2016, now Pat. No. 10,257,393, and a continuation-in-part of application No. 15/169,012, filed on May 31, 2016, now Pat. No. 10,257,394.

(60) Provisional application No. 62/294,820, filed on Feb. 12, 2016.

(51) Int. Cl.
| | |
|---|---|
| H04N 5/225 | (2006.01) |
| H04N 9/76 | (2006.01) |
| H04N 5/235 | (2006.01) |
| G02B 27/14 | (2006.01) |
| H04N 9/09 | (2006.01) |
| H04N 9/64 | (2023.01) |

(52) U.S. Cl.
CPC ....... *G02B 27/1066* (2013.01); *G02B 27/145* (2013.01); *H04N 5/2253* (2013.01); *H04N 5/2254* (2013.01); *H04N 5/2257* (2013.01); *H04N 5/2258* (2013.01); *H04N 5/2355* (2013.01); *H04N 9/09* (2013.01); *H04N 9/646* (2013.01); *H04N 9/76* (2013.01); *H04N 5/2251* (2013.01)

(58) Field of Classification Search
CPC .... H04N 5/2355; H04N 5/2251; H04N 9/646; H04N 9/76; H04N 9/09; G02B 27/106; G02B 27/1066; G02B 27/108; G02B 27/145
See application file for complete search history.

(56) References Cited

U.S. PATENT DOCUMENTS

| | | |
|---|---|---|
| 2,971,051 A | 2/1961 | Back |
| 3,202,039 A | 8/1965 | DeLang |
| 3,381,084 A | 4/1968 | Wheeler |
| 3,474,451 A | 10/1969 | Abel |
| 3,601,480 A | 8/1971 | Randall |
| 3,653,748 A | 4/1972 | Athey |
| 3,659,918 A | 5/1972 | Tan |
| 3,668,304 A | 6/1972 | Eilenberger |
| 3,720,146 A | 3/1973 | Yost, Jr. |
| 3,802,763 A | 4/1974 | Cook et al. |
| 3,945,034 A | 3/1976 | Suzuki |
| 4,009,941 A | 3/1977 | Verdijk et al. |
| 4,072,405 A | 2/1978 | Ozeki |
| 4,084,180 A | 4/1978 | Stoffels et al. |
| 4,134,683 A | 1/1979 | Goetz et al. |
| 4,268,119 A | 5/1981 | Hartmann |
| 4,395,234 A | 7/1983 | Shenker |
| 4,396,188 A | 8/1983 | Dreissigacker et al. |
| 4,486,069 A | 12/1984 | Neil et al. |
| 4,555,163 A | 11/1985 | Wagner |
| 4,584,606 A | 4/1986 | Nagasaki |
| 4,743,011 A | 5/1988 | Coffey |
| 4,786,813 A | 11/1988 | Svanberg et al. |
| 4,805,037 A | 2/1989 | Noble et al. |
| 4,916,529 A | 4/1990 | Yamamoto et al. |
| 4,933,751 A | 6/1990 | Shinonaga et al. |
| 5,024,530 A | 6/1991 | Mende |
| 5,092,581 A | 3/1992 | Koz |
| 5,093,563 A | 3/1992 | Small et al. |
| 5,134,468 A | 7/1992 | Ohmuro |
| 5,153,621 A | 10/1992 | Vogeley |
| 5,155,623 A | 10/1992 | Miller et al. |
| 5,194,959 A | 3/1993 | Kaneko et al. |
| 5,272,518 A | 12/1993 | Vincent |
| 5,275,518 A | 1/1994 | Guenther |
| 5,355,165 A | 10/1994 | Kosonocky et al. |
| 5,386,316 A | 1/1995 | Cook |
| 5,642,191 A | 6/1997 | Mende |
| 5,644,432 A | 7/1997 | Doany |
| 5,707,322 A | 1/1998 | Dreissigacker et al. |
| 5,729,011 A | 3/1998 | Sekiguchi |
| 5,734,507 A * | 3/1998 | Harvey ............... G02B 27/106 |
| | | 358/909.1 |
| 5,801,773 A | 9/1998 | Ikeda |
| 5,835,278 A | 11/1998 | Rubin et al. |
| 5,856,466 A | 1/1999 | Cook et al. |
| 5,881,043 A | 3/1999 | Hasegawa et al. |
| 5,881,180 A | 3/1999 | Chang et al. |
| 5,900,942 A | 5/1999 | Spiering |
| 5,905,490 A | 5/1999 | Shu et al. |
| 5,926,283 A | 7/1999 | Hopkins |
| 5,929,908 A | 7/1999 | Takahashi et al. |
| 6,011,876 A | 1/2000 | Kishner |
| 6,215,597 B1 | 4/2001 | Duncan et al. |
| 6,392,687 B1 | 5/2002 | Driscoll, Jr. et al. |
| 6,429,016 B1 | 8/2002 | McNeil |
| 6,614,478 B1 | 9/2003 | Mead |
| 6,633,683 B1 | 10/2003 | Dinh et al. |
| 6,646,716 B1 | 11/2003 | Ramanujan et al. |
| 6,674,487 B1 | 1/2004 | Smith |
| 6,747,694 B1 | 6/2004 | Nishikawa et al. |
| 6,801,719 B1 | 10/2004 | Szajewski et al. |
| 6,856,466 B2 | 2/2005 | Tocci |
| 6,937,770 B1 | 8/2005 | Oguz et al. |
| 7,068,890 B2 | 6/2006 | Soskind et al. |
| 7,084,905 B1 | 8/2006 | Nayar et al. |
| 7,138,619 B1 | 11/2006 | Ferrante et al. |
| 7,177,085 B2 | 2/2007 | Tocci et al. |
| 7,283,307 B2 | 10/2007 | Couture et al. |
| 7,336,299 B2 | 2/2008 | Kostrzewski et al. |
| 7,397,509 B2 | 7/2008 | Krymski |
| 7,405,882 B2 | 7/2008 | Uchiyama et al. |
| 7,535,647 B1 * | 5/2009 | Otten, III ........... G02B 27/1006 |
| | | 359/629 |
| 7,623,781 B1 * | 11/2009 | Sassa ................. G02B 27/1066 |
| | | 348/36 |
| 7,714,998 B2 | 5/2010 | Furman et al. |
| 7,719,674 B2 | 5/2010 | Furman et al. |
| 7,731,637 B2 | 6/2010 | D'Eredita |
| 7,961,398 B2 | 6/2011 | Tocci |
| 8,035,711 B2 | 10/2011 | Liu et al. |
| 8,320,047 B2 | 11/2012 | Tocci |
| 8,323,047 B2 * | 12/2012 | Reusche ............ H01R 13/5219 |
| | | 439/359 |
| 8,340,442 B1 | 12/2012 | Rasche |
| 8,441,732 B2 | 5/2013 | Tocci |
| 8,606,009 B2 | 12/2013 | Sun |
| 8,610,789 B1 | 12/2013 | Nayar et al. |
| 8,619,368 B2 | 12/2013 | Tocci |
| 8,622,876 B2 | 1/2014 | Kelliher |
| 8,659,683 B1 | 2/2014 | Linzer |
| 8,843,938 B2 | 9/2014 | MacFarlane et al. |
| 8,982,962 B2 | 3/2015 | Alshin et al. |
| 9,087,229 B2 | 7/2015 | Nguyen et al. |
| 9,129,445 B2 | 9/2015 | Mai et al. |
| 9,131,150 B1 | 9/2015 | Mangiat et al. |
| 9,258,468 B2 | 2/2016 | Cotton et al. |
| 9,264,659 B2 | 2/2016 | Abuan et al. |
| 9,277,122 B1 | 3/2016 | Imura et al. |
| 9,459,692 B1 | 10/2016 | Li |
| 9,488,984 B1 | 11/2016 | Williams et al. |
| 9,560,339 B2 | 1/2017 | Borowski |
| 9,633,417 B2 | 4/2017 | Sugimoto et al. |
| 9,654,738 B1 | 5/2017 | Ferguson et al. |
| 9,661,245 B2 | 5/2017 | Kawano |
| 9,675,236 B2 | 6/2017 | McDowall |
| 9,677,840 B2 | 6/2017 | Rublowsky et al. |
| 9,720,231 B2 | 8/2017 | Erinjippurath et al. |
| 9,779,490 B2 | 10/2017 | Bishop |
| 9,800,856 B2 | 10/2017 | Venkataraman et al. |
| 9,904,981 B2 | 2/2018 | Jung et al. |
| 9,948,829 B2 | 4/2018 | Kiser et al. |
| 9,955,084 B1 | 4/2018 | Haynold |
| 9,974,996 B2 | 5/2018 | Kiser |

(56) References Cited

U.S. PATENT DOCUMENTS

| | | |
|---|---|---|
| 9,998,692 B1 * | 6/2018 | Griffiths .............. H04N 17/002 |
| 10,038,855 B2 | 7/2018 | Cote et al. |
| 10,165,182 B1 | 12/2018 | Chen |
| 10,200,569 B2 | 2/2019 | Kiser et al. |
| 10,257,393 B2 | 4/2019 | Kiser et al. |
| 10,257,394 B2 | 4/2019 | Kiser et al. |
| 10,616,512 B2 | 4/2020 | Ingle et al. |
| 2002/0014577 A1 | 2/2002 | Ulrich et al. |
| 2002/0089765 A1 | 7/2002 | Nalwa |
| 2003/0007254 A1 | 1/2003 | Tocci |
| 2003/0016334 A1 | 1/2003 | Weber et al. |
| 2003/0048493 A1 | 3/2003 | Pontifex et al. |
| 2003/0072011 A1 | 4/2003 | Shirley |
| 2003/0081674 A1 | 5/2003 | Malvar |
| 2003/0122930 A1 | 7/2003 | Schofield et al. |
| 2003/0138154 A1 | 7/2003 | Suino |
| 2004/0119020 A1 | 6/2004 | Bodkin |
| 2004/0125228 A1 | 7/2004 | Dougherty |
| 2004/0143380 A1 | 7/2004 | Stam et al. |
| 2004/0156134 A1 * | 8/2004 | Furuki .................. G02B 5/04 359/883 |
| 2004/0179834 A1 | 9/2004 | Szajewski et al. |
| 2004/0202376 A1 | 10/2004 | Schwartz et al. |
| 2005/0001983 A1 | 1/2005 | Weber et al. |
| 2005/0041113 A1 | 2/2005 | Nayar et al. |
| 2005/0099504 A1 | 5/2005 | Nayar et al. |
| 2005/0117799 A1 | 6/2005 | Fuh et al. |
| 2005/0151860 A1 | 7/2005 | Silverstein et al. |
| 2005/0157943 A1 | 7/2005 | Ruggiero |
| 2005/0168578 A1 | 8/2005 | Gobush |
| 2005/0198482 A1 | 9/2005 | Cheung et al. |
| 2005/0212827 A1 | 9/2005 | Goertzen |
| 2005/0219659 A1 | 10/2005 | Quan |
| 2006/0001761 A1 | 1/2006 | Haba et al. |
| 2006/0002611 A1 | 1/2006 | Mantiuk et al. |
| 2006/0061680 A1 | 3/2006 | Madhavan et al. |
| 2006/0104508 A1 | 5/2006 | Daly et al. |
| 2006/0184040 A1 | 8/2006 | Keller et al. |
| 2006/0209204 A1 | 9/2006 | Ward |
| 2006/0215882 A1 | 9/2006 | Ando et al. |
| 2006/0221209 A1 | 10/2006 | McGuire et al. |
| 2006/0249652 A1 | 11/2006 | Schleifer |
| 2006/0262275 A1 | 11/2006 | Domroese et al. |
| 2007/0025717 A1 | 2/2007 | Raskar et al. |
| 2007/0086087 A1 | 4/2007 | Dent et al. |
| 2007/0133889 A1 | 6/2007 | Horie et al. |
| 2007/0152804 A1 | 7/2007 | Breed et al. |
| 2007/0182844 A1 * | 8/2007 | Allman .................. G02B 5/04 348/345 |
| 2007/0189750 A1 | 8/2007 | Wong et al. |
| 2007/0189758 A1 | 8/2007 | Iwasaki |
| 2007/0201560 A1 | 8/2007 | Segall et al. |
| 2007/0258641 A1 | 11/2007 | Srinivasan et al. |
| 2008/0013051 A1 | 1/2008 | Glinski et al. |
| 2008/0030611 A1 | 2/2008 | Jenkins |
| 2008/0037883 A1 | 2/2008 | Tsutsumi et al. |
| 2008/0055683 A1 | 3/2008 | Choe et al. |
| 2008/0068721 A1 * | 3/2008 | Murnan ............ G03F 7/70383 359/629 |
| 2008/0094486 A1 | 4/2008 | Fuh et al. |
| 2008/0100910 A1 | 5/2008 | Kim et al. |
| 2008/0112651 A1 | 5/2008 | Cho et al. |
| 2008/0175496 A1 | 7/2008 | Segall |
| 2008/0198235 A1 | 8/2008 | Chen et al. |
| 2008/0198266 A1 | 8/2008 | Kurane |
| 2008/0297460 A1 | 12/2008 | Peng et al. |
| 2008/0304562 A1 | 12/2008 | Chang et al. |
| 2009/0015683 A1 | 1/2009 | Ando |
| 2009/0059048 A1 | 3/2009 | Luo et al. |
| 2009/0161019 A1 | 6/2009 | Jang |
| 2009/0213225 A1 | 8/2009 | Jin et al. |
| 2009/0225433 A1 | 9/2009 | Tocci |
| 2009/0244717 A1 | 10/2009 | Tocci |
| 2009/0290043 A1 | 11/2009 | Liu et al. |
| 2010/0098333 A1 | 4/2010 | Aoyagi |
| 2010/0100268 A1 | 4/2010 | Zhang et al. |
| 2010/0149546 A1 | 6/2010 | Kobayashi et al. |
| 2010/0172409 A1 | 7/2010 | Reznik et al. |
| 2010/0201799 A1 * | 8/2010 | Mohrholz ............ H04N 5/2355 348/78 |
| 2010/0225783 A1 | 9/2010 | Wagner |
| 2010/0266008 A1 | 10/2010 | Reznik |
| 2010/0271512 A1 | 10/2010 | Garten |
| 2010/0328780 A1 | 12/2010 | Tocci |
| 2011/0028278 A1 | 2/2011 | Roach |
| 2011/0058050 A1 | 3/2011 | Lasang et al. |
| 2011/0188744 A1 | 8/2011 | Sun |
| 2011/0194618 A1 | 8/2011 | Gish et al. |
| 2011/0221793 A1 | 9/2011 | King, III et al. |
| 2012/0025080 A1 | 2/2012 | Liu et al. |
| 2012/0134551 A1 | 5/2012 | Wallace |
| 2012/0147953 A1 | 6/2012 | El-Mahdy et al. |
| 2012/0154370 A1 | 6/2012 | Russell et al. |
| 2012/0179833 A1 | 7/2012 | Kenrick et al. |
| 2012/0193520 A1 * | 8/2012 | Bewersdorf ....... G02B 19/0057 250/578.1 |
| 2012/0212964 A1 | 8/2012 | Chang et al. |
| 2012/0241867 A1 | 9/2012 | Ono et al. |
| 2012/0242867 A1 | 9/2012 | Shuster |
| 2012/0260174 A1 | 10/2012 | Imaida et al. |
| 2012/0299940 A1 | 11/2012 | Dietrich, Jr. et al. |
| 2012/0307893 A1 | 12/2012 | Reznik et al. |
| 2013/0021447 A1 | 1/2013 | Brisedoux et al. |
| 2013/0021505 A1 | 1/2013 | Plowman et al. |
| 2013/0027565 A1 | 1/2013 | Solhusvik et al. |
| 2013/0038689 A1 | 2/2013 | McDowall |
| 2013/0057971 A1 | 3/2013 | Zhao et al. |
| 2013/0063300 A1 | 3/2013 | O'Regan et al. |
| 2013/0064448 A1 | 3/2013 | Tomaselli et al. |
| 2013/0093805 A1 | 4/2013 | Iversen |
| 2013/0094705 A1 | 4/2013 | Tyagi et al. |
| 2013/0148139 A1 | 6/2013 | Matsuhira |
| 2013/0190965 A1 | 7/2013 | Einecke et al. |
| 2013/0194675 A1 | 8/2013 | Tocci |
| 2013/0215290 A1 | 8/2013 | Solhusvik et al. |
| 2013/0250113 A1 | 9/2013 | Bechtel et al. |
| 2013/0258044 A1 * | 10/2013 | Betts-Lacroix ...... H04N 13/243 348/E5.09 |
| 2013/0286451 A1 | 10/2013 | Verhaegh |
| 2013/0329053 A1 | 12/2013 | Jones et al. |
| 2013/0329087 A1 | 12/2013 | Tico et al. |
| 2014/0002694 A1 | 1/2014 | Levy et al. |
| 2014/0063300 A1 | 3/2014 | Lin et al. |
| 2014/0085422 A1 | 3/2014 | Aronsson et al. |
| 2014/0104051 A1 | 4/2014 | Breed |
| 2014/0132946 A1 | 5/2014 | Sebastian et al. |
| 2014/0152694 A1 | 6/2014 | Narasimha et al. |
| 2014/0168486 A1 | 6/2014 | Geiss |
| 2014/0184894 A1 | 7/2014 | Motta |
| 2014/0192214 A1 | 7/2014 | Laroia |
| 2014/0198187 A1 | 7/2014 | Lukk |
| 2014/0204195 A1 * | 7/2014 | Katashiba ............. G02B 21/04 348/79 |
| 2014/0210847 A1 | 7/2014 | Knibbeler et al. |
| 2014/0263950 A1 | 9/2014 | Fenigstein et al. |
| 2014/0297671 A1 | 10/2014 | Richard |
| 2014/0300795 A1 * | 10/2014 | Bilcu ................ G02B 27/1066 348/335 |
| 2014/0313369 A1 | 10/2014 | Kageyama et al. |
| 2014/0321766 A1 | 10/2014 | Jo |
| 2015/0077281 A1 | 3/2015 | Taniguchi et al. |
| 2015/0138339 A1 | 5/2015 | Einecke et al. |
| 2015/0151725 A1 | 6/2015 | Clarke et al. |
| 2015/0172608 A1 | 6/2015 | Routhier et al. |
| 2015/0175161 A1 | 6/2015 | Breed |
| 2015/0201222 A1 | 7/2015 | Mertens |
| 2015/0208024 A1 | 7/2015 | Takahashi et al. |
| 2015/0215595 A1 | 7/2015 | Yoshida |
| 2015/0245043 A1 | 8/2015 | Greenebaum et al. |
| 2015/0245044 A1 | 8/2015 | Guo et al. |
| 2015/0249105 A1 * | 9/2015 | Skeete .............. H01L 27/14636 257/434 |
| 2015/0296140 A1 | 10/2015 | Kim |
| 2015/0302562 A1 | 10/2015 | Zhai et al. |

(56) References Cited

U.S. PATENT DOCUMENTS

| | | |
|---|---|---|
| 2015/0312498 A1 | 10/2015 | Kawano |
| 2015/0312536 A1 | 10/2015 | Butler et al. |
| 2016/0007052 A1 | 1/2016 | Haitsuka et al. |
| 2016/0026253 A1 | 1/2016 | Bradski et al. |
| 2016/0050354 A1 | 2/2016 | Musatenko et al. |
| 2016/0057333 A1 | 2/2016 | Liu et al. |
| 2016/0163356 A1 | 6/2016 | De Haan et al. |
| 2016/0164120 A1 | 6/2016 | Swiegers et al. |
| 2016/0165120 A1 | 6/2016 | Lim |
| 2016/0173811 A1 | 6/2016 | Oh et al. |
| 2016/0191795 A1 | 6/2016 | Han et al. |
| 2016/0195877 A1 | 7/2016 | Franzius et al. |
| 2016/0205341 A1 | 7/2016 | Hollander et al. |
| 2016/0205368 A1 | 7/2016 | Wallace et al. |
| 2016/0252727 A1 | 9/2016 | Mack et al. |
| 2016/0323518 A1 | 11/2016 | Rivard et al. |
| 2016/0344977 A1 | 11/2016 | Murao |
| 2016/0345032 A1 | 11/2016 | Tsukagoshi |
| 2016/0353123 A1 | 12/2016 | Ninan |
| 2016/0360212 A1 | 12/2016 | Dai et al. |
| 2016/0360213 A1 | 12/2016 | Lee et al. |
| 2016/0375297 A1 | 12/2016 | Kiser |
| 2017/0006273 A1 | 1/2017 | Borer et al. |
| 2017/0026594 A1 | 1/2017 | Shida et al. |
| 2017/0039716 A1* | 2/2017 | Morris ............... G01N 21/3504 |
| 2017/0070719 A1 | 3/2017 | Smolic et al. |
| 2017/0084006 A1 | 3/2017 | Stewart |
| 2017/0126987 A1 | 5/2017 | Tan et al. |
| 2017/0155818 A1 | 6/2017 | Bonnet |
| 2017/0155873 A1 | 6/2017 | Nguyen |
| 2017/0186141 A1 | 6/2017 | Ha et al. |
| 2017/0237879 A1 | 8/2017 | Kiser et al. |
| 2017/0237890 A1 | 8/2017 | Kiser et al. |
| 2017/0237913 A1 | 8/2017 | Kiser et al. |
| 2017/0238029 A1 | 8/2017 | Kiser et al. |
| 2017/0270702 A1 | 9/2017 | Gauthier et al. |
| 2017/0279530 A1 | 9/2017 | Tsukagoshi |
| 2017/0302858 A1 | 10/2017 | Porter et al. |
| 2017/0352131 A1 | 12/2017 | Berlin et al. |
| 2018/0048801 A1 | 2/2018 | Kiser et al. |
| 2018/0054566 A1 | 2/2018 | Yaguchi |
| 2018/0152721 A1 | 5/2018 | Rusanovskyy et al. |
| 2018/0198957 A1 | 7/2018 | Kiser et al. |
| 2019/0014308 A1 | 1/2019 | Kiser et al. |
| 2019/0130630 A1* | 5/2019 | Ackerson ............... G06T 9/001 |
| 2019/0166283 A1 | 5/2019 | Kiser et al. |
| 2019/0238725 A1 | 8/2019 | Kiser et al. |
| 2019/0238726 A1 | 8/2019 | Kiser et al. |
| 2019/0238766 A1 | 8/2019 | Kiser et al. |
| 2019/0373260 A1 | 12/2019 | Kiser et al. |
| 2020/0036918 A1 | 1/2020 | Ingle et al. |
| 2020/0058104 A1 | 2/2020 | Kiser et al. |
| 2020/0059670 A1 | 2/2020 | Kiser et al. |
| 2020/0154030 A1 | 5/2020 | Kiser et al. |
| 2020/0320955 A1 | 10/2020 | Kiser et al. |
| 2020/0368616 A1 | 11/2020 | Delamont |
| 2021/0029271 A1 | 1/2021 | Kiser et al. |
| 2021/0034342 A1 | 2/2021 | Hoy |
| 2021/0044765 A1* | 2/2021 | Kiser ................... G02B 27/106 |
| 2021/0099616 A1 | 4/2021 | Kiser et al. |

FOREIGN PATENT DOCUMENTS

| | | |
|---|---|---|
| CN | 105472265 A | 4/2016 |
| EP | 0484802 A2 | 5/1992 |
| EP | 1225574 A2 | 7/2002 |
| EP | 1395062 A1 | 3/2004 |
| GB | 2526047 A | 11/2015 |
| GB | 2539917 A | 1/2017 |
| JP | S53093026 A | 8/1978 |
| JP | S53124028 A | 10/1978 |
| JP | S60213178 A | 10/1985 |
| JP | S63160489 A | 7/1988 |
| JP | H0468876 A | 3/1992 |
| JP | H0564070 A | 3/1993 |
| JP | H06335006 A | 12/1994 |
| JP | H07107346 A | 4/1995 |
| JP | H08220585 A | 8/1996 |
| JP | H11127441 A | 5/1999 |
| JP | 2000019407 A | 1/2000 |
| JP | 2000338313 A | 12/2000 |
| JP | 2001136434 A | 5/2001 |
| JP | 2002165108 A | 6/2002 |
| JP | 2002-369210 | 12/2002 |
| JP | 2002-369210 A | 12/2002 |
| JP | 2003035881 A | 2/2003 |
| JP | 2005-117524 | 4/2005 |
| JP | 2005-117524 A | 4/2005 |
| JP | 2007-243942 | 9/2007 |
| JP | 2007-243942 A | 9/2007 |
| JP | 2007-281816 | 10/2007 |
| JP | 2007-281816 A | 10/2007 |
| JP | 2007295326 A | 11/2007 |
| JP | 2014-524290 | 9/2014 |
| JP | 2014-524290 A | 9/2014 |
| WO | 2005025685 A1 | 3/2005 |
| WO | 2009/043494 | 4/2009 |
| WO | 2009/043494 A1 | 4/2009 |
| WO | 2009/111642 A1 | 9/2009 |
| WO | 2009/121068 A2 | 10/2009 |
| WO | 2011/032028 A2 | 3/2011 |
| WO | 2012/076646 A1 | 6/2012 |
| WO | 2013/025530 | 2/2013 |
| WO | 2013/025530 A1 | 2/2013 |
| WO | 2015/072754 A1 | 5/2015 |
| WO | 2015/173570 A1 | 11/2015 |
| WO | 2017/139363 | 8/2017 |
| WO | 2017/139363 A1 | 8/2017 |
| WO | 2017/139596 | 8/2017 |
| WO | 2017/139596 A1 | 8/2017 |
| WO | 2017/139600 | 8/2017 |
| WO | 2017/139600 A1 | 8/2017 |
| WO | 2017/157845 A1 | 9/2017 |

OTHER PUBLICATIONS

Nayar, 2000, High dynamic range imaging: spatially varying pixel exposures, 2000 Proc IEEE Conf on Comp Vision and Pattern Rec, ISSN: 1063-6919 (8 pages).

Nosratinia, 2002, Enhancement of JPEG-compressed images by re-application of JPEG, Journal of VLSI signal processing systems for signal, image and video technology (20 pages).

Oliveira, 2012, Functional programming with structured graphs, ICFP'12 (12 pages).

Rahman, 2011, Pipeline synthesis and optimization of FPGA-based video processing applications with CAL, EURASIP J Image Vid Processing 19:1-28.

Roberts, 2017, Lossy Data Compression: JPEG, Stanford faculty page (5 pages) Retrieved from the Internet on Feb. 3, 2017, from <https://cs.stanford.edu/people/eroberts/courses/soco/projects/data-compression/lossy/jpeg/dct.htm>( 5 pages).

Schulte, 2016, HDR Demystified: Emerging UHDTV systems, SpectraCal 1-22.

Sedigh, 1998, Evaluation of filtering mechanisms for MPEG video communications, IEES Symp Rel Dist Sys (6 pages).

Sony, 2017, HDR (High Dynamic Range), Sony Corporation (15 pages).

Stumpfel, 2004, Direct HDR Capture of the Sun and Sky, Computer graphics, virtual reality, visualisation and interaction in Africa (9 pages).

Tiwari, 2015, A review on high-dynamic range imaging with its technique, Int J Sig Proc, IPPR 8(9):93-100.

Tocci, 2011, A versatile HDR video production system, ACM Transactions on Graphics (TOG)—Proceedings of ACM SIG-GRAPH 2011, 30(4):article 41 (9 pages).

Touze, 2014, HDR video coding based on local LDR quantization, Second International Conference and SME Workshop on HDR imaging (6 pages).

Unattributed, 2018, JPEG YCbCr Support, Microsoft, Retrieved from the Internet on Nov. 20, 2019 from <https://docs.microsoft.com/en-us/windows/win32/wic/jpeg-ycbcr-support> (14 pages).

(56) References Cited

OTHER PUBLICATIONS

Wong, 2017, Ultra-low latency contiguous block-parallel stream windowing using FPGA on-chip memory, FPT 56-63.
Altera, 2010, Memory System Design, Chapter 7 in Embedded Design Handbook, Altera Corporation (18 pages).
Australian Examination Report issued in Australian Application No. 2017217929, dated Sep. 30, 2020 (5 pages).
Cao, 2003, Dynamic configuration management in a graph-oriented distributed programming environment, Sci Comp Prog 48:43-65.
Cao, 2005, GOP: A graph-oriented programming model for parallel and distributed systems, Chapter 2 in New Horizons of Parallel and Distributed Computing, Guo & Yang, Eds., Springer (Boston, MA) (17 pages).
Chan, 2005, Visual programming support for graph-oriented parallel/ distributed processing, Softw Pract Exper 35:1409-1439.
Damazio, 2006, A codec architecture for real-time High Dynamic Range video, VIII Symposium on Virtual and Augmented Reality (Belém, PA, Brazil) (9 pages).
Dhanani, 2008, HD video line buffering in FPGA, EE Times (5 pages).
Geronimo et al., Survey of Pedestrian Detection for Advanced Drive Assistance Systems, IEEE Transactions on Pattern Analysis and Machine Intelligence, vol. 32, Np. 7, Jul. 2010 (20 pages).
Gurel, 2016, A comparative study between RTL and HLS for image processing applications with FPGAs, Thesis, UC San Diego (78 pages).
Hegarty, 2014, Darkroom: compiling high-level image processing code into hardware pipelines, ACM Trans Graph 33(4):144 (11 pages).
Int Search Report and Written Opinion dated Apr. 14, 2017, for PCT/US2017/17396 (9 pages).
Int Search Report and Written Opinion dated Apr. 28, 2017, for PCT/US2017/17405 (9 pages).
Int Search Report and Written Opinion dated Dec. 10, 2019, for PCT/US19/046350 (10 pages).
Int Search Report and Written Opinion dated Dec. 6, 2019, for PCT/US19/46348 (9 pages).
Int Search Report and Written Opinion dated May 2, 2017, for PCT/US17/16991 (7 pages).
Int Search Report and Written Opinion dated May 8, 2017, for PCT/US17/17400 (8 pages).
Int Search Report and Written Opinion dated Oct. 23, 2017, for PCT/US 17/45683 (5 pages).
Int Search Report and Written Opinion dated Oct. 23, 2020, for PCT/US2020/044724 (8 pages).
Int Search Report and Written Opinion dated Sep. 11, 2019, for PCT/US19/35109 (10 pages).
Int Search Report and Written Opinion dated Sep. 11, 2019, for PCT/US2019/35109 (10 pages).
Int Search Report and Written Opinion dated Sep. 20, 2018, for PCT/US2018/041034 (10 pages).
Jack, 2005, Color spaces, Chapter 3 in Video Demystified: A Handbook for the Digital Engineer, 4Ed, Newnes (20 pages).
Kresch, 1999, Fast DCT domain filtering using the DCT and the DST, IEEE Trans Imag Proc (29 pages).
Lawal, 2007, C++ based system synthesis of real-time video processing systems targeting FPGA implementation, IEEE Int Par Dist Proc Symposium, Rome, pp. 1-7.
Lawal, 2008, Memory synthesis for FPGA implementations of real-time video processing systems, Thesis, Mid Sweden U (102 pages).

Aggarwal, 2004, Split Aperture Imaging for High Dynamic Range, Int J Comp Vis 58(1):7-17.
Alleysson, 2006, HDR CFA Image Rendering, Proc EURASIP 14th European Signal Processing Conf. (5 pages).
Banterle, 2009, High dynamic range imaging and low dynamic range expansion for generating HDR content, Eurographics State of the The Art Report (18 pages).
Borer, 2014, Non-linear opto-electrical transfer functions for high dynamic range television, Research and Development White Paper, British Broadcasting Corporation (24 pages).
Bravo, 2011, Efficient smart CMOS camera based on FPGAs oriented to embedded image processing, Sensors 11:2282-2303.
Debevec, 1997, Recovering High Dynamic Range Radiance Maps from Photographs, Int Conf Comp Graphics and Interactive Techniques, proceedings (10 pages).
Flux Data Inc, 2008, FD-1665 High Resolution 3 CCD Multispectral Industrial Camera, web.archive.orgweb20080113023949www.fluxdata.com/prod (7 pages).
Gural, 2016, A comparative study between RTL and HLS for image processing applications with FPGAs, Thesis, UC San Diego (78 pages).
Kao, 2008, High Dynamic Range Imaging by Fusing Multiple Raw Images and Tone Reproduction, IEEE Transactions on Consumer Electronics 54(1):10-15.
Lukac, 2004, Demosaicked Image Postprocessing Using Local Color Ratios, IEEE Transactions on Circuits and Systems for Video Technology 14(6):914-920.
Lyu, 2014, A 12-bit high-speed column parallel two-step single-slope analog-to-digital converter (ADC) for CMOS image sensors, Sensors 14:21603-21625.
Machine translation of CN 101344706 B, generated on May 19, 2017, by espacenet (11 pages).
Machine translation of JP 2000019407 A generated on May 30, 2017, by EPO website (52 pages).
Machine translation of JP 2000338313 A generated on Dec. 21, 2016, by Espacenet (9 pages).
Machine translation of JP 2001136434 A generated on Dec. 21, 2016, by Espacent (25 pages).
Machine translation of JP 2002165108 A generated on Dec. 21, 2016, by Espacenet (27 pages).
Machine translation of JP 2003035881 A genertaed on May 30, 2017, by EPO website (19 pages).
Machine translation of JP 2007295326 A generated on Dec. 21, 2016, by the European Patent Office website Espace.net (12 pages).
Machine translation of JP H04068876 A generated on Dec. 21, 2016, by Espacent (8 pages).
Machine translation of JP H0564070 A generated on Dec. 21, 2016, by Espacenet (19 pages).
Machine translation of JP H06335006 A generated on Dec. 21, 2016, by Espacenet (9 pages).
Machine translation of JP H07107346 generated on Dec. 21, 2016, by Espacent (21 pages).
Machine translation of JP H08 220585 A obtained Feb. 3, 2020, from Espacenet (14 pages).
Machine translation of JP S53093026 A, issued as JP S599888, generated on Dec. 21, 2016 (5 pages).
Machine translation of JP S60213178 A generated on May 30, 2017, by EPO website (6 pages).
Machine translation of JPH08220585 generated by European Patent Office on Oct. 15, 2019 (11 pages).

* cited by examiner

SYSTEMS AND METHODS FOR HDR VIDEO CAPTURE WITH A MOBILE DEVICE

FIELD OF THE INVENTION

The present invention generally relates to image capture and processing, and, more particularly, to systems and methods for high dynamic range (HDR) image capture and video processing in mobile devices.

BACKGROUND

The human visual system is capable of identifying and processing visual features with a high degree of dynamic range. Dynamic range generally refers to the range of light intensities from the darkest shadows to the brightest highlights. For example, real-world scenes with contrast ratios of 1,000,000:1 or greater can be accurately processed by the human visual cortex. The human eye, through adaptation of the iris and other methods, adjusts constantly to the broad dynamic changes ubiquitous in our environment. The brain continuously interprets this information so that a viewer can see in a wide range of light conditions.

Most image acquisition devices, however, have limited High Dynamic Range (HDR) imaging capabilities. Some cameras are only capable of reproducing or capturing Low Dynamic Range (LDR), resulting in a loss of image accuracy and failure to capture the image as the human eye would see it. For example, traditional photography includes capturing of images in a scene at a single exposure level in the imaging device, resulting in an image with a limited contrast range. The limited contrast (or dynamic) range results in a loss of detail in bright areas of a picture (if the imaging device used one exposure setting) and/or a loss of detail in dark areas (if the imaging device used a different exposure setting). A common example of this effect is a photograph in which the sky appears almost white, while objects on the ground are exposed sufficiently so as to allow details of those objects to be seen. In other words, when taking a picture in the high contrast environment, original colors, original tones, and original details appearing in an actual scene may almost disappear in a high illumination area or a low illumination area.

In an attempt to overcome the disadvantages described above, some image acquisition devices have been designed to capture several frames of the same scene while changing the exposure from frame to frame, then utilizing post-processing techniques to fuse the captured frames together in an attempt to generate an HDR image. However, when the camera, or a subject, or an object of a background is moving during image acquisition, deterioration may be caused by such motion during the HDR fusion process, as the captured frames are different from one another. Thus, a significant problem with conventional methods is the inability to produce HDR images in real, or near-real time, further limiting the ability of image acquisition devices to provide HDR video imaging. Furthermore, current HDR imaging systems may be bulky and thus may not lend themselves for use in smaller, more compact image acquisition devices.

SUMMARY

The present invention provides an optical system configured to provide High Dynamic Range (HDR) image capture and video processing in a mobile device. High Dynamic Range means having a dynamic range greater than the range that can be obtained using a single image sensor, typically 8 bits in depth. In particular, the optical system includes a relatively compact design to provide optimal use in small mobile devices, such as, for example, a mobile phone, a smartphone, a tablet computer, a wearable computer, or a digital mobile camera.

The optical system includes an image capture subsystem configured to capture images via at least two image sensors and an image processing subsystem configured to process image data into HDR video data to be stored or outputted to a display, or other device. The compact design of the optical system is a result of a specific arrangement of components of the image capture subsystem. In particular, the image capture subsystem includes at least two image sensors fixed in a co-planar arrangement to a substrate and an optical splitting module configured to reflect at least about 95% of incident light received through an aperture of a camera of a mobile device onto the image sensors, to thereby capture a high dynamic range image. The optical splitting module includes a beamsplitter specifically configured to transmit a first portion of incident light to a first reflective member and to reflect a second portion of the incident light to a second reflective member, wherein the first and second reflective members transmit at least about 95% of the incident light onto the two image sensors. The beamsplitter is arranged to provide light paths of substantially the same length to the two co-planar image sensors, thereby maintaining co-registration of the image sensors with one another.

The use of two or more image sensors is advantageous in that different light levels for the same image are able to be captured via the two different sensors simultaneously, as opposed to conventional systems which use a single image sensor capturing different levels in a sequential manner. Accordingly, the image data from each of the two image sensors is processed at the same time, thereby resulting in improved HDR image and video processing in real, or near-real, time and can further account for movement from frame to frame. Furthermore, placement of the image sensors along the same plane is advantageous in that the image sensors are co-registered with one another on the same substrate and thus correspondingly move with one another, which improves the durability of the image capture subsystem. For example, during normal use, a camera may move erratically or encounter substantial impacts resulting in movement of internal components of the camera that may affect performance. By placing the image sensors on the same substrate, the image sensors will effectively share the same amount of movement, and thus remain aligned with one another such that performance will remain unaffected. Furthermore, the image capture and image processing subsystems may share the same integrated circuit (IC), thereby further lending to the overall compact design of the system, which can provide substantial savings by reducing manufacturing costs and allowing for relatively simple incorporation into existing mobile devices.

Aspects of the invention include a device for high dynamic range (HDR) image capture. The device includes at least two image sensors fixed in a co-planar arrangement to a substrate and an optical splitting system configured to reflect at least about 90% of incident light received through an aperture of the device onto the image sensors, to thereby capture a high dynamic range image. For example, in some embodiments, greater than about 95% of the incident light received through the aperture of the device is reflected onto the image sensors.

In some embodiments, the optical splitting system includes a beamsplitter configured to transmit a first portion of incident light to a first reflective member and to reflect a second portion of the incident light to a second reflective member, wherein the first and second reflective members reflect at least about 90% of the incident light onto the image sensors.

In some embodiments, the image sensors are configured to detect different portions of a spectrum of visible light. In some embodiments, the first portion of incident light includes about 96% of light entering the aperture of the device and the second portion of incident light includes about 4% of light entering the aperture of the device. The beamsplitter may be positioned so as to transmit 96% of the second portion of incident light from the second reflective member onto the image sensors. In some embodiments, the transmitted second portion includes about 3.84% of light entering the aperture of the device. Each of the first and second reflective members includes a substrate having a reflective coating. In some embodiments, the first and second reflective members are mirrors.

The image sensors are configured to generate image data based, at least in part, on light received from the optical splitting system. The system may further comprise an HDR processing system configured to process the image data from the image sensors so as to generate HDR image and/or video data.

In some embodiments, the image sensors are fixed to a substrate of an integrated circuit (IC). In some embodiments, the image sensors are monolithically formed along a portion of the substrate. The image sensors may be formed from the same material via any known process, including, but not limited to, lithography or etching. In some embodiments, the substrate is bonded to a portion of an integrated circuit (IC). The image sensors may include charge-coupled device (CCD) image sensors or complementary metal-oxide semiconductor (CMOS) image sensors.

In some embodiments, the image sensors and the optical splitting system are integrated into a mobile device. The mobile device may include a handheld computing device including, but not limited to, a mobile phone, a smartphone, a tablet computer, a wearable computer, a digital mobile camera, and a combination of at least two thereof.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

Figure 1:
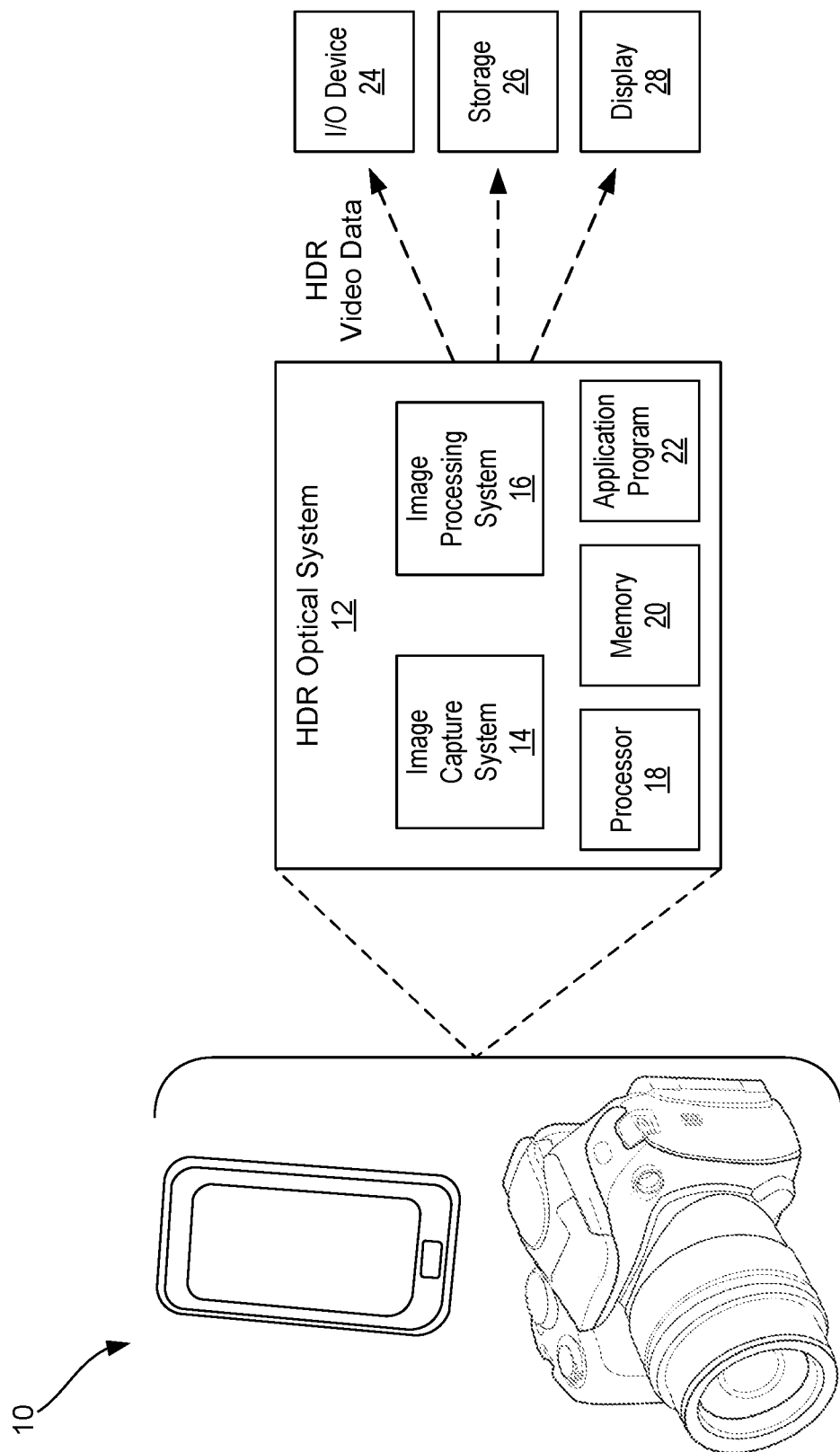
FIG. 1 is a block diagram of a system for providing HDR image capture and video processing for a mobile device consistent with the present disclosure.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DETAILED DESCRIPTION

By way of overview, the present disclosure generally relates to an optical system configured to provide high dynamic range (HDR) image capture and video processing in a mobile device. The optical system includes an image capture subsystem configured to capture images via at least two image sensors and an image processing subsystem configured to process image data into HDR video data to be stored or outputted to a display, or other device.

The optical system is of a compact design which is optimal for use in small mobile devices, such as, for example, a mobile phone, a smartphone, a tablet computer, a wearable computer, or a digital mobile camera. The compact design is a result of a specific arrangement of components of the image capture subsystem. In particular, the image capture subsystem includes at least two image sensors fixed in a co-planar arrangement to a substrate and an optical splitting module configured to reflect at least about 90% of incident light received through an aperture of a camera of a mobile device onto the image sensors, to thereby capture a high dynamic range image. The beamsplitter is arranged to provide light paths of substantially the same length to the two co-planar image sensors, thereby maintaining co-registration of the image sensors with one another.

The use of two or more image sensors is advantageous in that different light levels for the same image are able to be captured via the two different sensors simultaneously, as opposed to conventional systems which use a single image sensor capturing different levels in a sequential manner. Accordingly, the image data from each of the two image sensors can be processed at the same time, thereby resulting in improved HDR image and video processing in real, or near-real, time and can further account for movement from frame to frame. Furthermore, placement of the image sensors along the same plane is advantageous in that the image sensors are co-registered with one another on the same substrate and thus correspondingly move with one another, which improves the durability of the image capture subsystem. For example, during normal use, a camera may move erratically or encounter substantial impacts that may result in movement of internal components of the camera and may affect performance. By placing the image sensors on the same substrate, the image sensors will effectively share the same amount of movement, and thus remain aligned with one another such that performance will remain unaffected. Furthermore, the image capture and image processing subsystems may share the same integrated circuit (IC), thereby further lending to the overall compact design of the system, which can provide substantial savings by reducing manufacturing costs and allowing for relatively simple incorporation into existing mobile devices.

FIG. 1 is a block diagram of an optical system 12 for providing HDR image capture and video processing for a mobile device 10. As shown, the system 12 may be included within a mobile device 10 having a camera, such as a handheld computing device, which may include, for example, a mobile phone, a smartphone, a tablet computer, a wearable computer, a digital mobile camera. The optical system 12 generally includes an image capture subsystem 14 configured to capture images and an image processing subsystem 16 configured to process image data from the image capture subsystem 14 into HDR image and video data. The optical system 12 further includes one or more processors 18, memory 20, and application programs 22 (software) for collecting and analyzing image data captured by the image capture subsystem 14 for further storing (long-term or temporary) information. Upon processing the image data, the image processing subsystem 16 may further output processed HDR image or video data to an I/O device 24 coupled to the optical system 12, storage 26, or a display 28 (e.g., a viewfinder or display on the mobile device 10, a separate display coupled (via wired or wireless transmission) to the mobile device 10, or the like).

Figure 2:
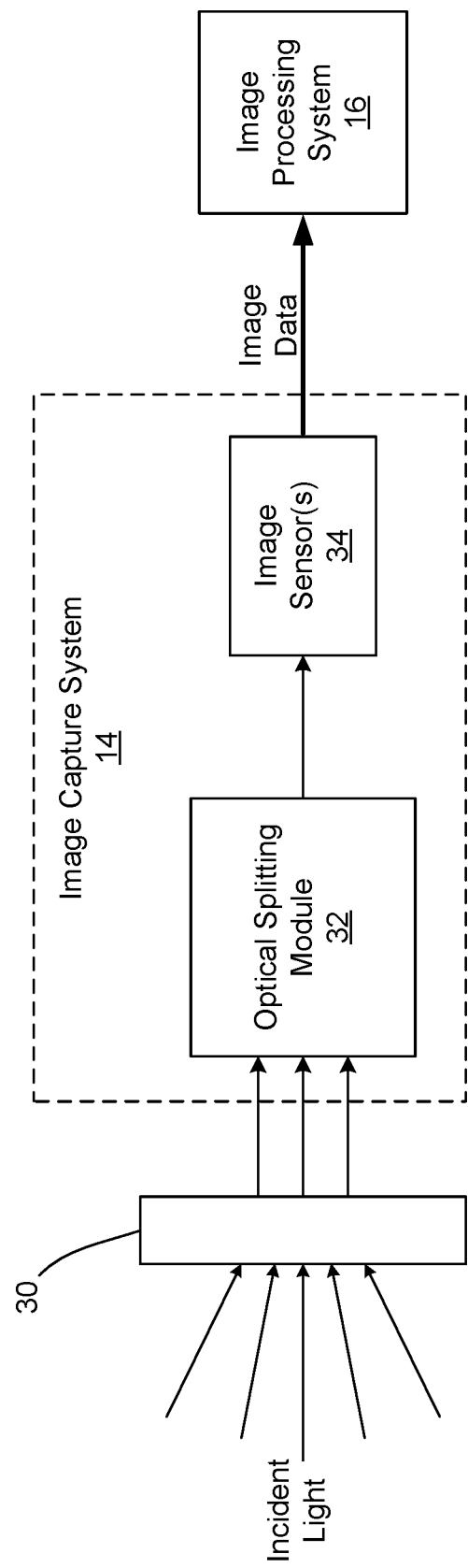
FIG. 2 is a block diagram illustrating the image capture system of FIG. 1 in greater detail.

FIG. 2 is a block diagram illustrating the image capture subsystem 14 of FIG. 1 in greater detail. As shown, the image capture subsystem 14 may generally include an optical splitting module 32 and image sensors 34. The optical splitting module 32 is configured to receive incident light received through an aperture 40 of a camera of the mobile device 10 and providing portions of the incident light to the image sensors 34. The image sensors 34, upon being exposed to portions of the incident light, are configured to provide image data to the image processing subsystem 16 for subsequent processing into HDR image and video data.

Figure 3:
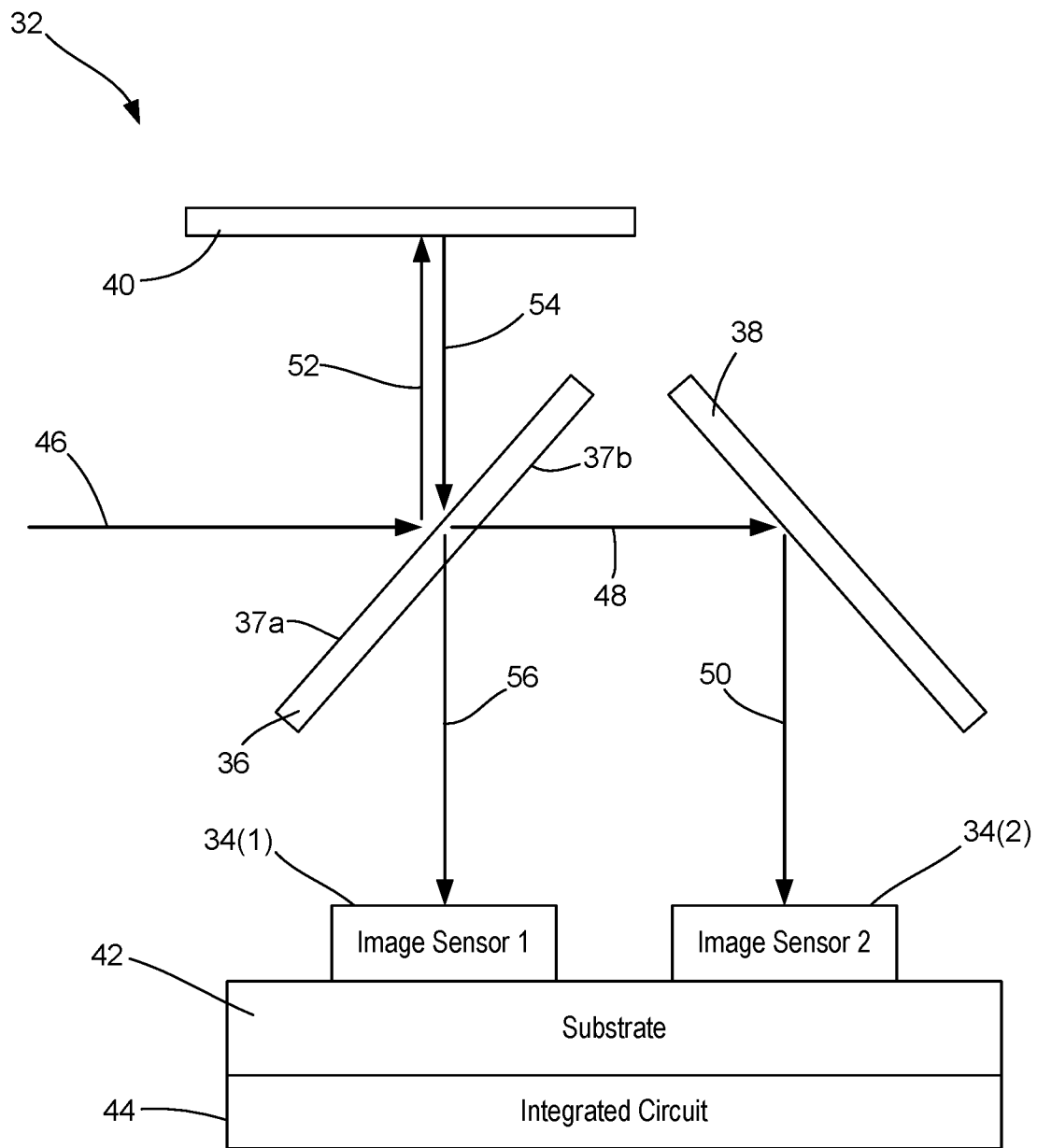
FIG. 3 is a schematic of an embodiment of a beamsplitter for directing incident light towards at least two image sensors fixed in co-planar arrangement.

For example, as shown in FIG. 3, the optical splitting module 32 includes a beamsplitter 36 configured to direct incident light towards at least two image sensors 34(1) and 34(2). Although shown with two image sensors, it should be noted that systems consistent with the present disclosure may include more than two image sensors (i.e., three, four, five, six . . . ten, or more). As used throughout, the term "beamsplitter" generally refers to a partially reflecting optical element that can both transmit and reflect incident light, including but not limited to a partially reflecting mirror, a prism, a pellicle, and/or one or more optical coatings or layers. Accordingly, as shown in FIG. 3, the beamsplitter 36 may be coated on a first surface 37a with a partially-reflecting broadband coating and coated on a second surface 37b with an anti-reflective coating. The optical splitting module 32 further includes first and second reflective members 38, 40 configured to reflect portions of light towards the image sensors 34(1), 34(2), as will be described in greater detail herein. The first and second reflective members 38, 40 may generally be embodied as mirrors or the like.

As shown, the first and second image sensors 34(1) and 34(2) may be fixed in a co-planar arrangement to a substrate 42. In some embodiments, the substrate 42 may be fixed to an integrated circuit (IC) (e.g., by way of monolithic bonding techniques). As will be described in greater detail herein, the first and second image sensors 34(1) and 34(2) may be formed from the same material and on the same substrate, such as monolithically formed along a portion of the substrate 42 (shown in FIGS. 4A and 4B). As used throughout, the term "image sensor" may generally refer to a detector, optical detector, sensor, CMOS sensor, CCD sensor, linear detector array, film, celluloid, or any other optically sensitive medium or device. Accordingly, in embodiments described herein, the first and second image sensors 34(1) and 34(2) may include charge-coupled device (CCD) image sensors or complementary metal-oxide semiconductor (CMOS) image sensors, including an array of light detection elements (e.g., pixels). Upon exposure to the incident light reflected by the optical splitting module 32, the first and second sensors 34(1) and 34(2) are configured to generate image data based, at least in part, on the intensity of light exposed thereto. In turn, the image data is then passed on to the image processing subsystem 16 for processing and conversion into processed HDR image and/or video data.

As shown in FIG. 3, incident light 46 travels along a path towards the beamsplitter 36. The beamsplitter 36 is configured to transmit a first portion of incident light 48 to the first reflective member 38. In turn, the first reflective member 38, by way of a reflective surface, is configured to reflect the first portion of incident light 48 towards at least one of the image sensors (shown as the second image sensor 34(2)), as indicated by pathway 50.

The beamsplitter 36 is further configured to further reflect a second portion of incident light 52 to the second reflective member 40, due to the partially reflective coating on the first surface 37a. The second reflective member 40, by way of a reflective surface, is configured to reflect the second portion of incident light 52 back towards the beamsplitter 36, as indicated by pathway 54. In turn, the beamsplitter 36 transmits the majority of the reflected second portion of incident light (indicated by 54) onto at least one of the image sensors (shown as the first image sensor 34(1)), as indicated by pathway 56.

Accordingly, the beamsplitter 36 of the present invention is configured in such as manner so as to receive light that has initially been reflected therefrom. For example, as previously described herein, the beamsplitter 3 is configured to reflect at least a portion (portion 52) of the incident light 46 to a reflective member (second reflective member 40), which, in turn, reflects that portion of light back towards the beamsplitter 36 to be transmitted through the beamsplitter 36 and onto the image sensors 34(1) and 34(2).

The beamsplitter 36 is configured to reflect and subsequently receive the same portion of light as a result of a low reflectance surface, due, in part, to its use in an HDR capture scheme of the present invention. This configuration would not be possible if the capture scheme included a color separation, or even a 50/50 beamsplitting setup, for example. The beamsplitter 36 may generally include at least a 90% transmittance and a 10% reflectance. Thus, the transmittance of the first portion of incident light 48 through the beamsplitter 36 and subsequent reflection thereof (via the first reflective member 38) may be unhindered, such that an image sensor (sensor 34(2)) may be exposed to the entirety of the first portion of light 48 (e.g., 90% of the total incident light 46). The second portion of incident light 52, when directed back towards and through the beamsplitter 36, may to drop slightly (e.g., second portion of light 52 may drop from 10% to 9% of the total incident light 46), such that an image sensor (sensor 34(1)) may be exposed to almost the entirety of the second portion of light 52. Thus, the configuration of the optical splitting module 32, particularly the design of the beamsplitter 36 relative to the co-planar image sensors 34(1) and 34(2), allows for a majority (e.g., at least 98%) of the incident light 46 received through the aperture 30 of a camera on the mobile device 10 to be provided to the image sensors 34(1) and 34(2).

A 50/50 beamsplitter configuration would not be able to provide such a high percentage of light capture when compared to the design of the present invention. For example, with a 50/50 beamsplitting design, 50% of light would be transmitted while 50% would be reflected, initially. The reflected portion of light, when redirected through back into the beamsplitter, would end up dropping down to about 25% of the total incident light, thereby causing a loss of 25% of the incident light.

The configuration of the optical splitting module 32 of the present invention provides a substantial improvement in light capture in that by directing a reflected portion of light straight back through the beamsplitter, instead of routing the reflected portion of light around the beamsplitter, as provided in some current schemes, the present invention is able to accomplish significant space savings (e.g., a reduction in total optical path length from the imaging lens to the sensor(s)). Accordingly, the system 12 of the present invention is compatible with lenses having lower f-number (greater light gathering capability). Furthermore, the design of the optical splitting module 32 does not require that the initial beam of incident light 46 be "narrow", as is the case with current light capturing systems and designs (e.g., some designs result in routing reflected light around a beamsplitter to be provided towards a sensor). Thus, the system 12 of the present invention does not suffer the restrictions on beam width, which further restricts an imaging lens exit pupil size and location, which current systems face.

Furthermore, the particular configuration of the optical splitting module 32 and co-planar image sensors 34(1) and 34(2) allows for the system 12 of the present invention to be integrated into a mobile device, such as a mobile phone, a smartphone, a tablet computer, a wearable computer, a digital mobile camera, and a combination of at least two thereof. For example, in mobile applications, imaging lenses are often designed with an aperture stop (or pupil) located a relatively far distance from a back side of the lens, such as, at a front side of the lens in order to decrease the required size of the outermost lens element. However, as previously described, current image capturing systems lack sufficient design and are incompatible for mobile use, as current image systems are unable to function in an environment in which the imaging lens' aperture stop is located at a front side of the lens. The particular configuration of the optical splitting module 32 and co-planar image sensors 34(1) and 34(2) allows for the system 12 to function in such an arrangement and thus allows for the system 12 to be more compatible with smaller system applications, such as imaging in mobile device cameras.

As previously described, the first and second portions of incident light 48 and 52 may have different levels of intensity. For example, in some embodiments, the first portion 48 may include 96% of the incident light 46, while the second portion 52 may include approximately 4% of the incident light 46. The reflection of the first portion of incident light may be unhindered, such that the second image sensor 34(2) may be exposed to 96% of the incident light. Due to transmission via the beamsplitter 36, the transmitted second portion of incident light exposed to the first image sensor 34(1) may be slightly less than 4% (e.g., it may be 96% of the original 4%, or 3.84%). Thus, in total, greater than about 99% of the incident light 46 received through the aperture 30 of a camera on the mobile device 10 is reflected onto the image sensors 34(1) and 34(2). Note that reflectance values of mirrors such as reflective members 38, 40 may be less than 100%, which may cause the total light reflected onto the image sensors 34(1) and 34(2) to decrease from the 99% value in the present example. It should be noted that the beamsplitter 36 is configured to be tuned, or otherwise replaced with a beamsplitter having different transmittance/reflectance properties, so as to adjust the portions of light to be initially transmitted and reflected. For example, the beamsplitter may transmit 90% of incident light towards the first reflector 38 and reflect 10% of incident light towards the second reflector 40.

Because the first and second image sensors 34(1) and 34(2) are fixed in co-planar arrangement, both are configured to receive substantially the same amount of light exposure time, but at different intensities. For example, due to the arrangement of the beamsplitter 36 and the first and second reflector members 38, 40, the image sensor 34(1) is exposed to the second portion of incident light, which generally includes about 3.84% of the incident light, while image sensor 34(2) is exposed to the first portion of incident light, which is about 96% of the incident light. Thus, image sensors 34(1) and 34(2) are configured to simultaneously capture substantially identical images with substantially different light levels. The particular arrangement of the beamsplitter 36 and first and second reflective members 38 and 40 provides for pathways 50 and 56 of incident light to have substantially the same length, thereby maintaining equal focus of the image sensors 34(1), 34(2) with one another. Equal focus is critical for a number of reasons. For example, by maintaining the same lengths of light beams received by each of the image sensors 34(1) and 34(2), image data captured by the image sensors 34(1), 34(2) is spatially and temporally identical in structure, as the only difference between image data for each image sensor 34(1), 34(2) is the light intensity.

Accordingly, the image data from each of the image sensors 34(1) and 34(2) can then be transmitted to the image processing subsystem to be processed at the same time. By processing image data concurrently, as opposed to in a serial fashion, the present system allows for improved HDR image and video processing in real, or near-real, time because each set of image data from the image sensors is identical, but for the associated levels of light intensity. Thus, because each set includes image data with relatively high light level (e.g., 96% from image sensor 34(2)) and image data with relatively low light level (e.g., 3.84% from image sensor 34(1)), processing can be performed immediately during the capture of a single frame. This is much improved over some current systems that rely on a single image sensor for capturing single frames at the different light intensities in an alternating fashion (e.g., capture frame with high light level, then capture frame with low light level, then capture frame with high light level, etc.), where processing cannot occur until at least two different frames have been captured.

Figure 4A:
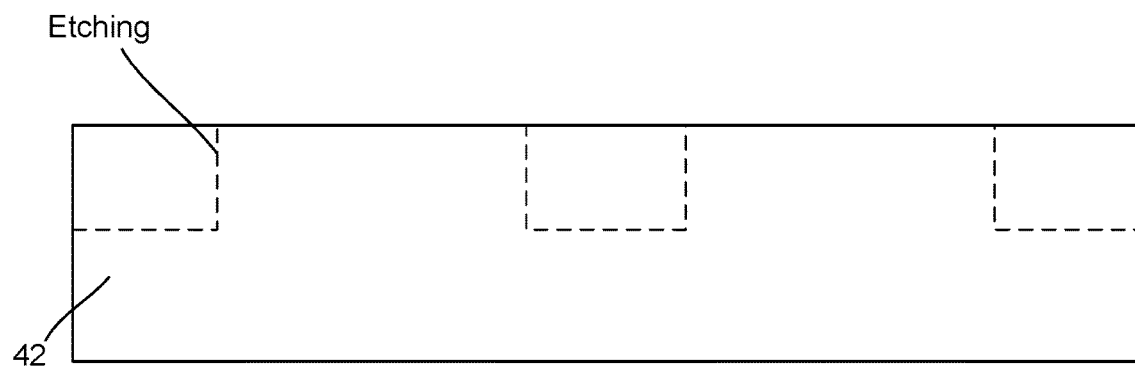
FIGS. 4A and 4B are sectional views of a substrate illustrating a process of monolithically forming the image sensors into a surface of the substrate.
Figure 4B:
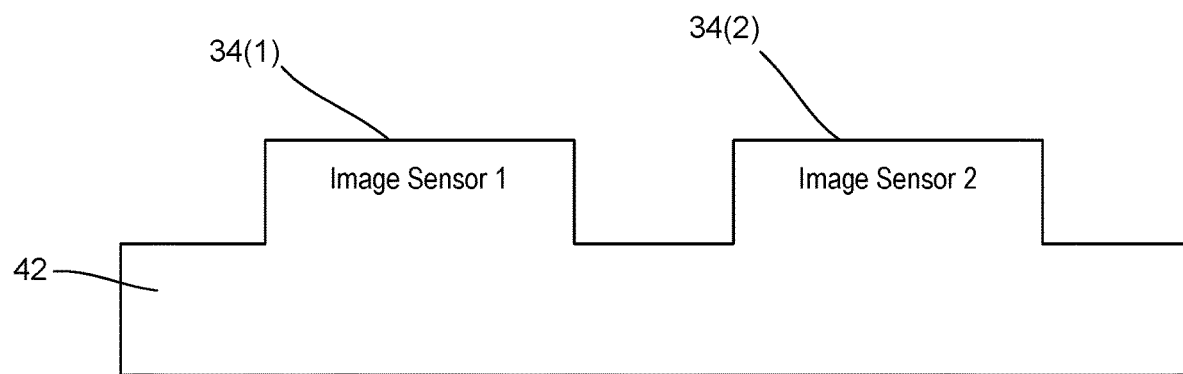

FIGS. 4A and 4B are sectional views of a substrate 42 illustrating a process of forming the image sensors 34(1) and 34(2) into a surface of the substrate 42. As previously described, the image sensors 34(1) and 34(2) may be fixed in co-planar arrangement on the substrate 42. In some embodiments, the image sensors may be formed on the substrate via any known technique. For example, in the event that the image sensors are complementary metal-oxide semiconductor (CMOS) devices, the image sensors may be formed by any known additive process, etching, or lithography technique, in which the image sensors are monolithically formed as part of the substrate 42. Forming the image sensors as part of the substrate allows for accurate placement of the image sensors in co-planar arrangement with one another.

Placement of the image sensors along the same plane on the substrate is advantageous in that the image sensors are co-registered with one another on the same substrate and thus correspondingly move with one another, which improves the durability of the image capture subsystem. For example, during normal use, a camera may move erratically or encounter substantial impacts (e.g., dropping smartphone on ground, impact between mobile camera and objects during sports activities or the like, which such movement or impact result in movement of internal components of the camera and may affect performance. By placing the image sensors on the same substrate, the image sensors will effectively share the same amount of movement, and thus remain aligned with one another such that performance will remain unaffected.

The substrate 42 may further be bonded to an IC, for example, upon which one or more other components of the optical system 12 may be placed. For example, in some embodiments, both the image capture and image processing subsystems 14 and 16 may share the same integrated circuit (IC), thereby further lending to the overall compact design of the system, which can provide substantial savings by reducing manufacturing costs and allowing for relatively simple incorporation into existing mobile devices.

Figure 5:
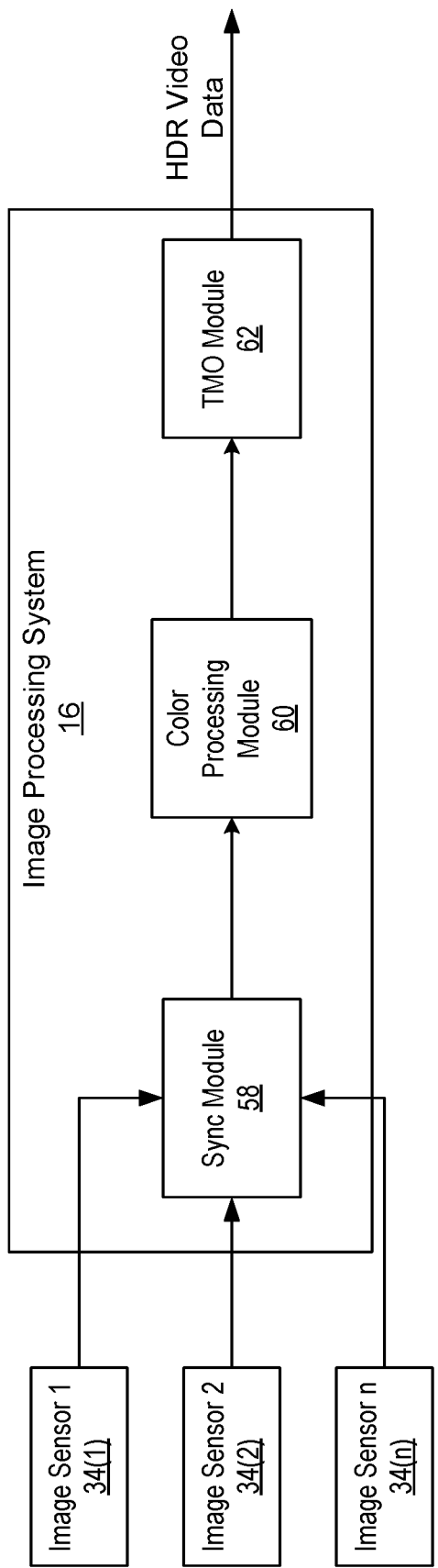
FIG. 5 is a block diagram illustrating the image processing subsystem in greater detail, including the flow of image data from the image capture subsystem to the image processing subsystem.

FIG. 5 is a block diagram illustrating the image processing subsystem 16 in greater detail, including the flow of image data from the image capture subsystem 14 to the image processing subsystem 16. As shown, the image processing subsystem 16 may be configured to receive image data from a plurality of image sensors 34(1)-34(n). The image processing subsystem 16 may include components configured to provide processing and compression techniques on the image data (e.g., HDR merging, H.264 or JPEG compression, tonemapping, residual HDR pixel values, etc.) so as to generate HDR video data. In this example, image data from the image sensors 34(1)-34(n) is transmitted to a sync module 58. The image data may include information related to the captured image and light intensity, such as values of pixels from one or more pixels indicative of a detected color intensity. The synch module 58 is configured to synchronize the pixel signals with one another, at which point the pixel signals may then be sent to a color processing module 60. The color processing module 60 may include one or more submodules configured to perform additional processing steps, including, but not limited to, a linearization module, color match module that executes a color matching process, a color correction module that executes a color correction process. The purpose of a color matching process is to merge images from multiple sensors together, in stages where two images are merged at a time, in a way that preserves color information from one sensor to the next, including components and processes discussed in application Ser. No. 62/294,820, filed Feb. 12, 2016, the contents of which are incorporated by reference herein in their entirety. The color corrected information can then optionally undergo additional processing by, for example, a tone mapping operator (TMO) module 62, at which point, HDR video data can then transmitted to an I/O device 24, storage 26, and/or a display 28.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry.

Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A device for high dynamic range (HDR) image capture, the device comprising:
   at least first and second co-planar image sensors fixed to a substrate;
   an optical splitting system comprising a beamsplitter configured to
      (i) transmit at least about 90% of incoming light received through an aperture of said device along a first path that gets reflected onto the first image sensor, and
      (ii) reflect a remainder of the incoming light along a second path that gets reflected back through the beamsplitter and onto the second image sensor,
   wherein the first and second paths have substantially the same length whereby the first and second image sensors simultaneously capture images that are identical but at different light levels; and
   an HDR processing system configured to process said two images to form a high dynamic range image.

2. The device of claim 1, wherein said beamsplitter is configured to transmit a first portion of incident light to a first reflective member and to reflect a second portion of the incident light to a second reflective member, wherein said first and second reflective members reflect incident light onto said image sensors.

3. The device of claim 1, wherein the beamsplitter transmits about 90% of the incoming light along the first path and reflects about 10% of the incoming light along the second path.

4. The device of claim 3, wherein about 90% of the 10% of incoming light reflected along the second path is transmitted back through the beamsplitter and onto the second image sensor.

5. The device of claim 1, wherein said image sensors are fixed to a substrate of an integrated circuit.

6. The device of claim 1, wherein said image sensors are monolithically formed along a portion of said substrate.

7. The device of claim 6, wherein said substrate is bonded to a portion of an integrated circuit.

8. The device of claim 1, wherein said image sensors are charge-coupled device (CCD) image sensors or complementary metal-oxide semiconductor (CMOS) image sensors.

9. The device of claim 1, wherein said image sensors and said optical splitting system are integrated into a mobile device having a camera.

10. The device of claim 9, wherein said mobile device comprises a smartphone.

11. A high dynamic range (HDR) camera comprising:
    at least first and second co-planar image sensors; and
    a beamsplitter configured to
       (i) transmit at least about 96% of incoming light received through an aperture of said device along a first path that gets reflected onto the first image sensor, and
       (ii) reflect a remainder of the incoming light along a second path that gets reflected back through the beamsplitter and onto the second image sensor,
    wherein the first and second paths have substantially the same length whereby the first and second image sensors simultaneously capture images that are identical but at different light levels.

12. The camera of claim 11, wherein the reflected remainder includes about 4% of the incoming light.

13. The camera of claim 12, wherein about 3.84% of incoming light is transmitted back through the beamsplitter and onto the second image sensor.

14. The camera of claim 13, wherein the first and second co-planar image sensors receive about 96% plus 3.84% of the incoming light and the balance of the incoming light is not captured by sensors.

15. The camera of claim 11, wherein the first and second co-planar sensors are fixed to a substrate within the camera and coupled an HDR processing system configured to process the captured images to form an HDR image.

16. The camera of claim 15, wherein the HDR processing system includes a field programmable gate array (FPGA).

17. The camera of claim 15, wherein the camera is part of a smartphone.

* * * * *